United States Patent [19]
Bowling

[11] Patent Number: 6,021,825
[45] Date of Patent: Feb. 8, 2000

[54] STUMP CUTTER APPARATUS FOR QUICK CONNECTION TO AN EXCAVATOR OR OTHER PRIME MOVER

[76] Inventor: John M. Bowling, 9376 Lincoln Way East, Orrville, Ohio 44667

[21] Appl. No.: 08/924,162

[22] Filed: Sep. 5, 1997

Related U.S. Application Data

[60] Provisional application No. 60/025,593, Sep. 6, 1996.
[51] Int. Cl.⁷ .............................. A01G 23/06; B27C 9/00
[52] U.S. Cl. .......................... 144/24.12; 37/302; 56/255; 144/334; 241/101.72; 241/101.74
[58] Field of Search ................................ 37/301, 302, 92, 37/468; 56/249, 249.5, 251, 255, 294, 12.7; 241/101.72, 101.74; 144/24.12, 336, 4.1, 335, 334

[56] References Cited

U.S. PATENT DOCUMENTS

| | | |
|---|---|---|
| 1,312,450 | 8/1919 | McKoy et al. . |
| 2,912,022 | 11/1959 | Ver Ploeg et al. . |
| 3,198,224 | 8/1965 | Hiley . |
| 3,308,860 | 3/1967 | De Shano . |
| 3,568,740 | 3/1971 | Speakman . |
| 3,685,557 | 8/1972 | Groce . |
| 4,074,447 | 2/1978 | Shivers, Jr. et al. . |
| 4,271,879 | 6/1981 | Shivers, Jr. et al. . |
| 4,355,670 | 10/1982 | Ohrberg et al. . |
| 4,709,736 | 12/1987 | Bellars . |
| 5,003,759 | 4/1991 | Brown . |
| 5,203,388 | 4/1993 | Bowling . |
| 5,355,918 | 10/1994 | Lang . |
| 5,829,497 | 11/1998 | Maroney ............................... 144/24.12 |

OTHER PUBLICATIONS

Rayco RG 1635–A/SA, Spec. Data, Rayco Manufacturing, Inc. 1991.
Rayco RG 1665(AC), Spec. Data, Rayco Manufacturing, Inc. 1991.
Rayco RG 1635–A, Spec. Data, Rayco Manufacturing, Inc. 1991.
Rayco RG 1670–DC, Spec. Data, Rayco Manufacturing, Inc. 1991.

*Primary Examiner*—W. Donald Bray
*Attorney, Agent, or Firm*—Oldham & Oldham Co., L.P.A.

[57] ABSTRACT

A stump cutting apparatus for connection to an excavator or other prime mover for conveyance in any ground breaking or farm industry. The stump cutter apparatus comprises a chassis for supporting for supporting stump cutter, a cutting assembly, an engine for providing power to the cutting assembly, an attachment member for releasably attaching the stump cutter to an excavator or other prime movers. The chassis may include one or more support legs or in the alternative one or more wheels to allow for support and easy movement of the apparatus. The cutting assembly comprises of support legs which comprises one or more spikes extending downward to be able to be received by the surface to enable the apparatus to be secure during stump cutting operation. The stump cutting apparatus also has several hydraulic cylinders for supporting the stump cutter by retracting and extending the members of the apparatus and enable to cutter wheel to move to meet the objective of user for cutting stumps and roots.

26 Claims, 9 Drawing Sheets

6,021,825

1

STUMP CUTTER APPARATUS FOR QUICK CONNECTION TO AN EXCAVATOR OR OTHER PRIME MOVER

This application claims benefit of U.S. provisional Ser. No. 60/025,593 filed Sep. 6, 1996.

FIELD OF INVENTION

The present invention relates generally to a stump cutting apparatus, and more particularly to a stump cutting apparatus for connection to an earth working apparatus such as an excavator or any other prime mover used for conveyance in any ground breaking or farm industry.

BACKGROUND OF THE INVENTION

Stump cutter devices are well known and very effective devices that are used to eradicate tree stumps from the earth. These known stump cutters are commercially available in a wide variety of sizes and configurations from various manufacturers including Rayco Manufacturing, Inc., Wooster Ohio. Stump cutters are available in either a trailer configuration where the stump cutter is pulled behind a truck or similar vehicle, or in a self-propelled configuration, where the stump cutter includes wheels or tracks.

Stump cutters are often needed on tracts of land that have recently been cleared of trees and other obstructions. Often, a large amount of excavation is occurring on the tract of land in conjunction with the tree removal. In light of the presence of one or more excavators or other prime movers at these sites, it has been proposed to provide a stump cutting apparatus that releasably attaches to the boom of an excavator or similar apparatus such that a separate, self-contained stump cutter is not needed.

Known stump cutter attachments that releasably connect to the end of a boom of an excavator have not proven to be satisfactory, especially where a large amount of stumps must be cleared from a wide area of land. Existing devices rely upon the excavator to continuously maneuver the cutting assembly, rely upon the excavator to apply the force needed to engage the cutting assembly with the stump, and are configured such that the operator of the excavator is unable to see the stump and the cutting operations thereon. Known stump cutters for attachment to excavators and other prime movers are configured such that the operator can be exposed to flying debris, and such that the control of the movement of the cutting assembly is difficult, especially in light of the fact that the movement of the entire excavator, boom, or both must be utilized to move the cutting assembly during cutting operations. The control of a prime mover and stump cutter in this manner to remove a stump is very difficult.

Also, the removal of a stump, especially when repeated numerous times as required on most building sites, using a prime mover with known stump cutting attachments, can place a large strain on the prime mover causing excessive "wear and tear" of the prime mover and its associated components. Upon encountering a stump, the cutting assemblies of these known attachments transmit large forces back through the frame and other components of the prime mover—e.g., through the boom of the excavator, and can cause excessive wear on these components. Also, with known stump cutter designs for attachment to a prime mover, the prime mover and its associated hydraulics are utilized to force the stump cutting assembly into the stump.

SUMMARY OF THE INVENTION

In light of the deficiencies and dangers associated with known stump cutters that releasably attach to excavators and other prime movers, the present invention is directed to a stump cutting apparatus for connection to an excavator or other prime mover which is safe, effective, and which eliminates excessive wear and tear of the prime mover. The stump cutter of the present invention comprises a chassis for supporting the stump cutter above a surface such as the ground at a work site and a cutter head assembly connected to the chassis and moveable relative thereto. An engine is preferably provided and connected to the chassis for providing power to the cutting assembly, although prime mover power may also be utilized via a power take-off drive system, alone or in combination with a hydrostatic drive system. An attachment member is connected to the chassis for releasably attaching the stump cutter to a mating attachment member located on an excavator boom or located on a frame component of another prime mover such that the stump cutter is essentially transverse relative to the boom or frame component. The chassis may simply include one or more support legs for supporting the stump cutter above the ground, and may alternatively or additionally include one or more wheels such that the stump cutter can be rolled or towed when not in use.

The stump cutter of the present invention provides numerous advantages over known stump cutters for attachment to prime movers. The transverse relationship of the stump cutter relative to the boom of the excavator or relative to the frame of another type of prime mover provides a safe and effective apparatus with superior operator vision and control and provides the operator with a position that is not in the path of flying debris. The present invention provides a stump cutter that attaches to a prime mover such that wear and tear of the prime mover is minimized and such that the operator may more easily and safely control the stump cutting operations independent of the prime mover.

DETAILED DESCRIPTION OF THE INVENTION

Figure 1:
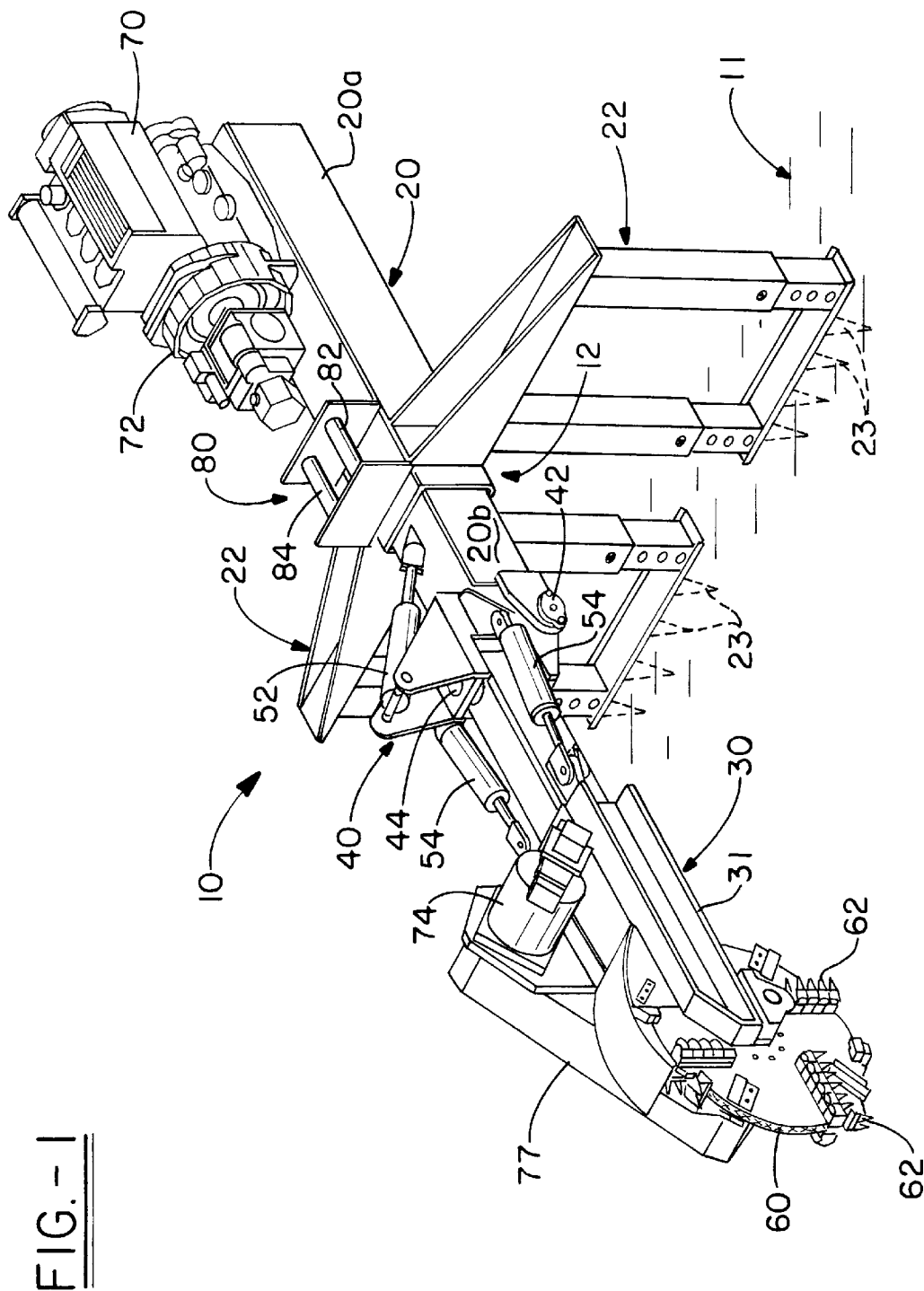
FIG. 1 is a perspective view of a stump cutter apparatus in accordance with the present invention.

Referring now to FIGS. 1–11, wherein like components in different embodiments are designated with like reference numerals, a stump cutter apparatus in accordance with the present invention is shown generally at 10, 10', 10" and comprises a chassis 12 for supporting the stump cutter 10 above a support surface 11 which will ordinarily be the ground at work site where the stump cutter is being employed to eradicate tree stumps 13. In a first embodiment of the invention as shown in FIGS. 1–9, stump cutter chassis 12 comprises a telescoping frame 20, comprising female member or component 20a that slidably receives male member or component 20b, and one or more support leg assemblies 22 connected thereto for supporting frame 20 above surface 11. Support leg assemblies 22 include one or more legs that are preferably selectively extensible relative to frame 20 (either manually as shown herein or with the aid of one or more hydraulic cylinders) such that the overall height of stump cutter 10 above surface 11 may be varied depending upon the height of the stump being removed. As is shown most clearly in FIGS. 6 and 7, support leg assemblies 22 may include telescoping portions 22a that are slidably received within fixed portions 22b, with the relative position therebetween being fixed upon the insertion of a pin into and through hole 24b and one of aligned holes 24a in each of legs 22b, 22a, respectively. Support leg assemblies 22 also preferably comprise one or more spikes 23 depending from the feet thereof for insertion through surface 11 to help prevent the movement of the stump cutter 10 relative to surface 11 during stump cutting operations.

Figure 10:
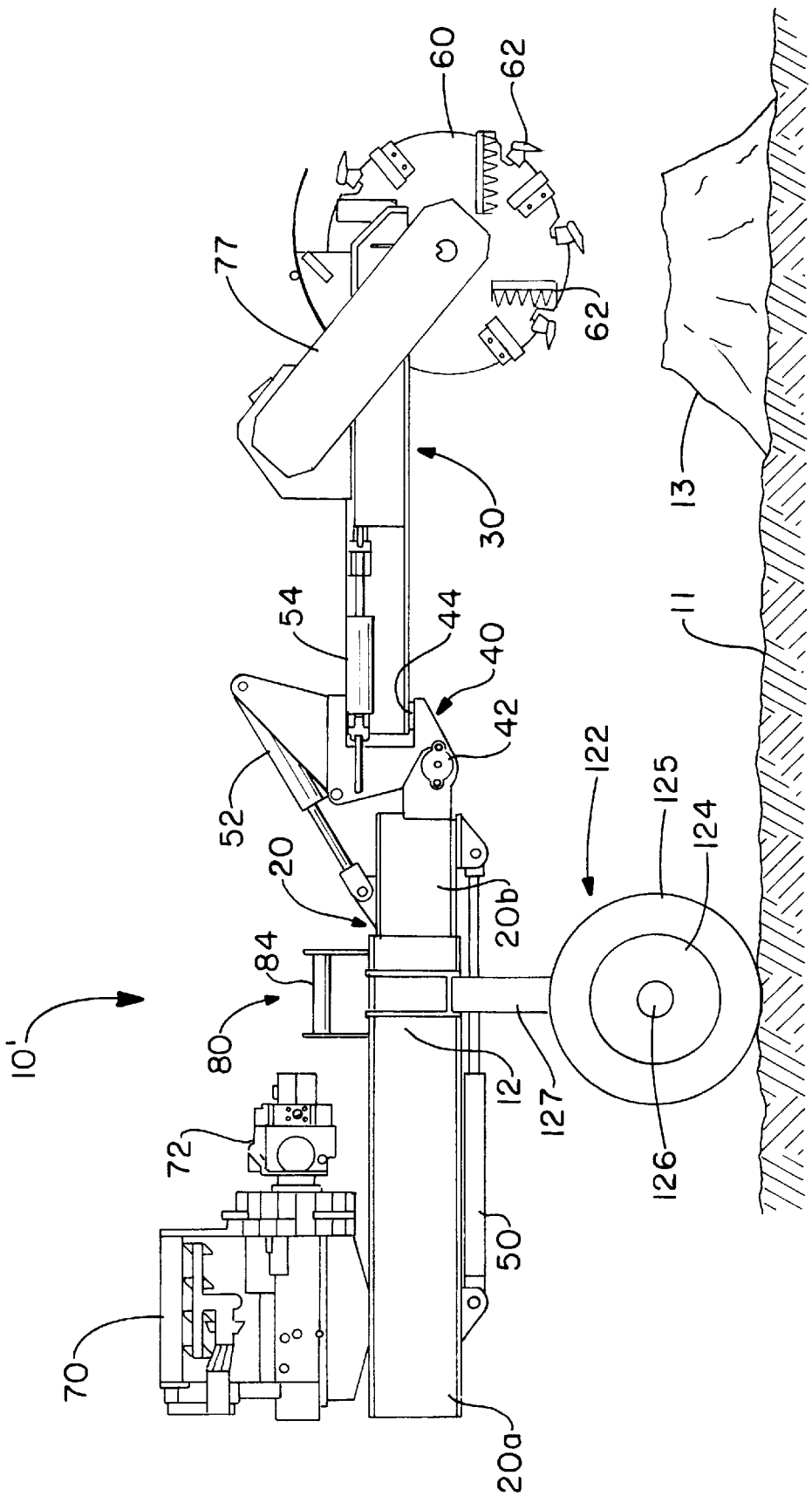
FIG. 10 is a side elevational view of an alternative embodiment of a stump cutter apparatus in accordance with the present invention; and, FIG. 11 is a side elevational view of an alternative embodiment of a stump cutter in accordance with the present invention.

FIG. 10 shows a stump cutter apparatus 10' in accordance with the present invention which is similar in all respects to stump cutter apparatus 10, except that chassis 12 of stump cutter 10' comprises a wheel assembly 122 rather than one or more support leg assemblies 22 for supporting telescoping frame 20 of chassis 12 above support surface 11. Wheel assembly 122 comprises one or more wheels 124, including a tire 125 mounted thereon, rotatably mounted on an axle 126 which is, in turn, connected to frame 20 by a support leg assembly 127. Wheel assembly 122 is provided merely to facilitate the movement of the apparatus 10' when in storage or to facilitate the towing of apparatus 10' when it is not in use. Thus, all wheels 124 of assembly 122 are preferably restrained from rotation during stump cutting operations. Alternatively, wheel assembly 122 may simply be removed once the stump cutter 10' has been transported to the job site, and one or more leg assemblies 22 can be substituted. Thus, wheel assembly 122 may be provided as an alternative to or in addition to support leg assemblies 22 as shown in FIGS. 1–9.

A cutter head assembly 30 is provided and comprises a cutting boom 31 connected to male frame member 20b through a hinge assembly 40 such that cutting boom 31 is movable relative to member 20b. Specifically, boom 31 is movable in a vertical plane relative to member 20b about hinge 42 of hinge assembly 40, and may be swept side-to-side in a horizontal plane relative to member 20b about hinge 44 of hinge assembly 40. Cutter head assembly 30 is also selectively extensible relative to frame 20, and as shown herein, the selective extension therebetween is provided by the sliding engagement of male and female members 20a, 20b of frame 20. A hydraulic cylinder 50 (FIGS. 4, 5, 9, and 10) or other like mechanism is provided and connected between frame member 20a and frame member 20b to selectively extend or retract the male member 20b (and consequently cutter head assembly 30) relative to female frame member 20a. Likewise, a hydraulic cylinder 52 or a like mechanism is connected between frame member 20b and boom 31 to pivot boom 31 about hinge 42 relative to frame 20. Finally, hydraulic cylinders 54 or the like are provided and connected between boom 31 and male frame member 20b to selectively pivot boom in a horizontal plane about hinge 44 of hinge assembly 40 relative to member 20b in a side-to-side or sweeping fashion.

Cutter head assembly 30 comprises a cutting wheel 60 rotatably supported on the distal end thereof and including a plurality of cutting teeth 62 connected thereto. A means for powering the cutting wheel 60, preferably a diesel, gasoline, or other internal combustion engine 70 as shown herein, is provided at opposite end of apparatus 10, 10' relative to cutter head assembly 30 to act as a counterweight to cutter head assembly 30, and is secured to frame 20. Engine 70, or another suitable means for powering the cutting wheel 60, is provided to drive cutting wheel 60 through means such as hydrostatic components such that when cutting wheel 60 approaches a tree stump 13, teeth 62 thereof comminute the stump 13 and associated roots as is well known in the art of stump cutters. Engine 70 may drive wheel 60 through a wide variety of suitable mechanisms, and as shown herein, a hydraulic pump 72 is provided and driven by engine 70 to establish a sufficiently high hydraulic pressure to operate hydraulic motor 74 at a sufficient speed and with sufficient torque to drive cutting wheel 60 through stumps 13 as described above. Cutting wheel 60 is drivingly coupled to hydraulic motor 74 through a belt 76 (not visible due to guard 77), or may be driven by a chain, shaft, or any other suitable drive member. Hydraulic pump 72 is also utilized to supply hydraulic fluid under pressure to cylinders 50, 52, and 54 as described above to effect the movement of cutter head assembly 30.

Figure 2:
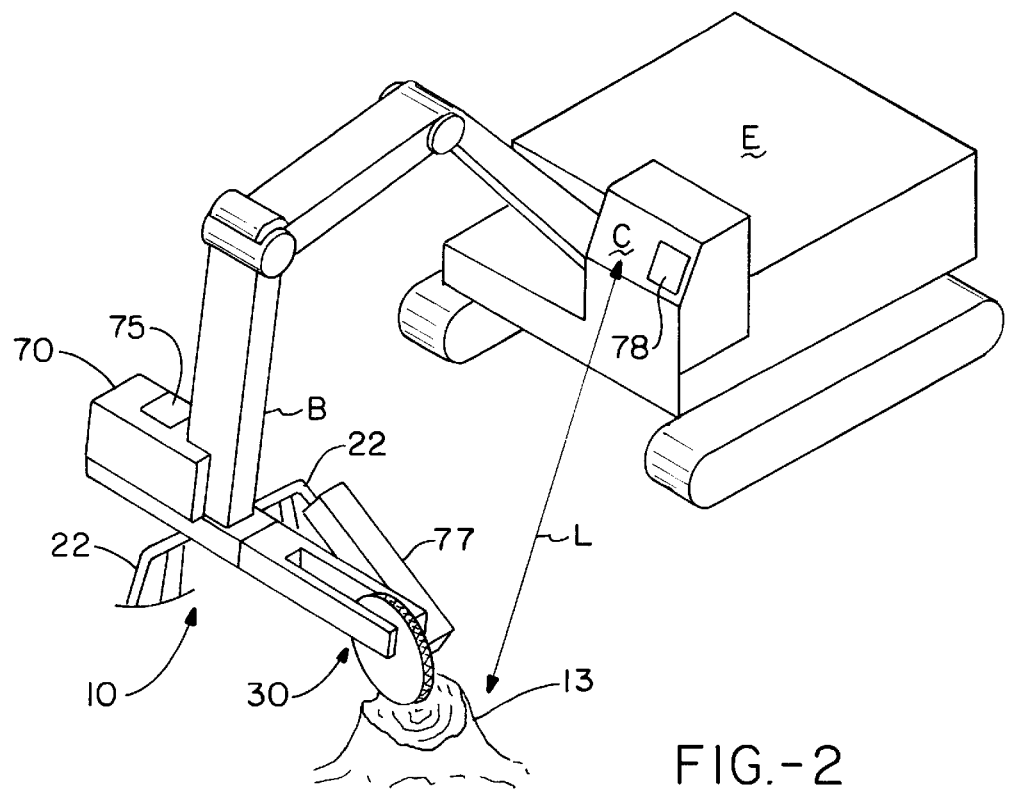
FIG. 2 is a schematic illustration of a stump cutter in accordance with the present invention as it is connected to a prime mover (shown as an excavator)
Figure 3:
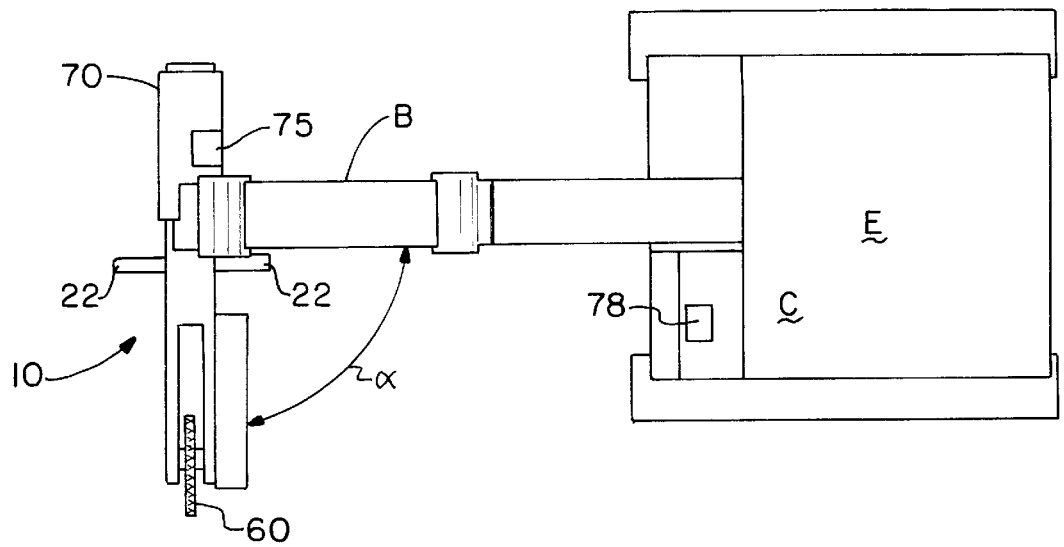
FIG. 3 is a schematic top plan view of a stump cutter in accordance with the present invention as it is connected to an excavator.
Figure 4:
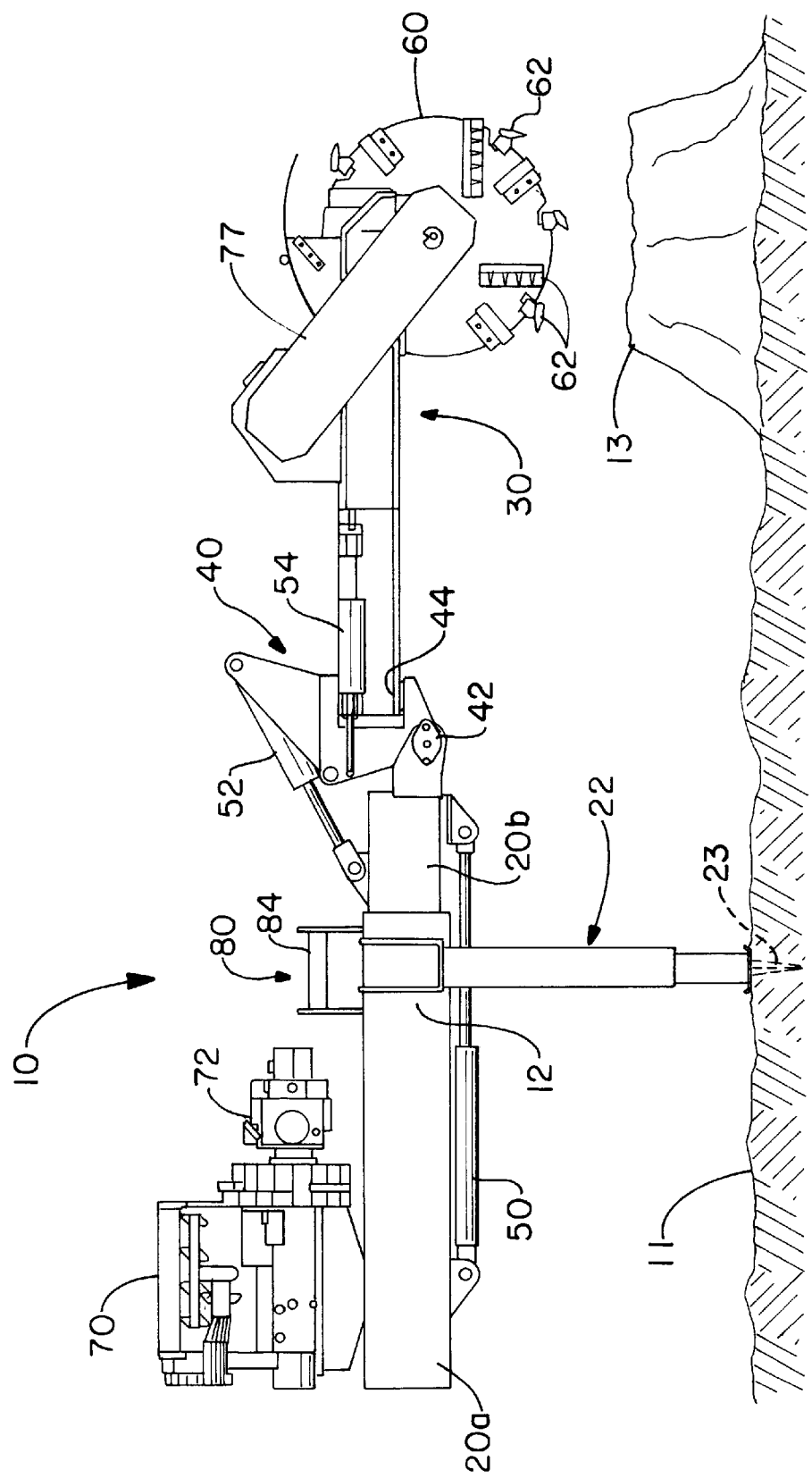
FIG. 4 is right side elevational view of a stump cutter apparatus in accordance with the present invention.
Figure 5:
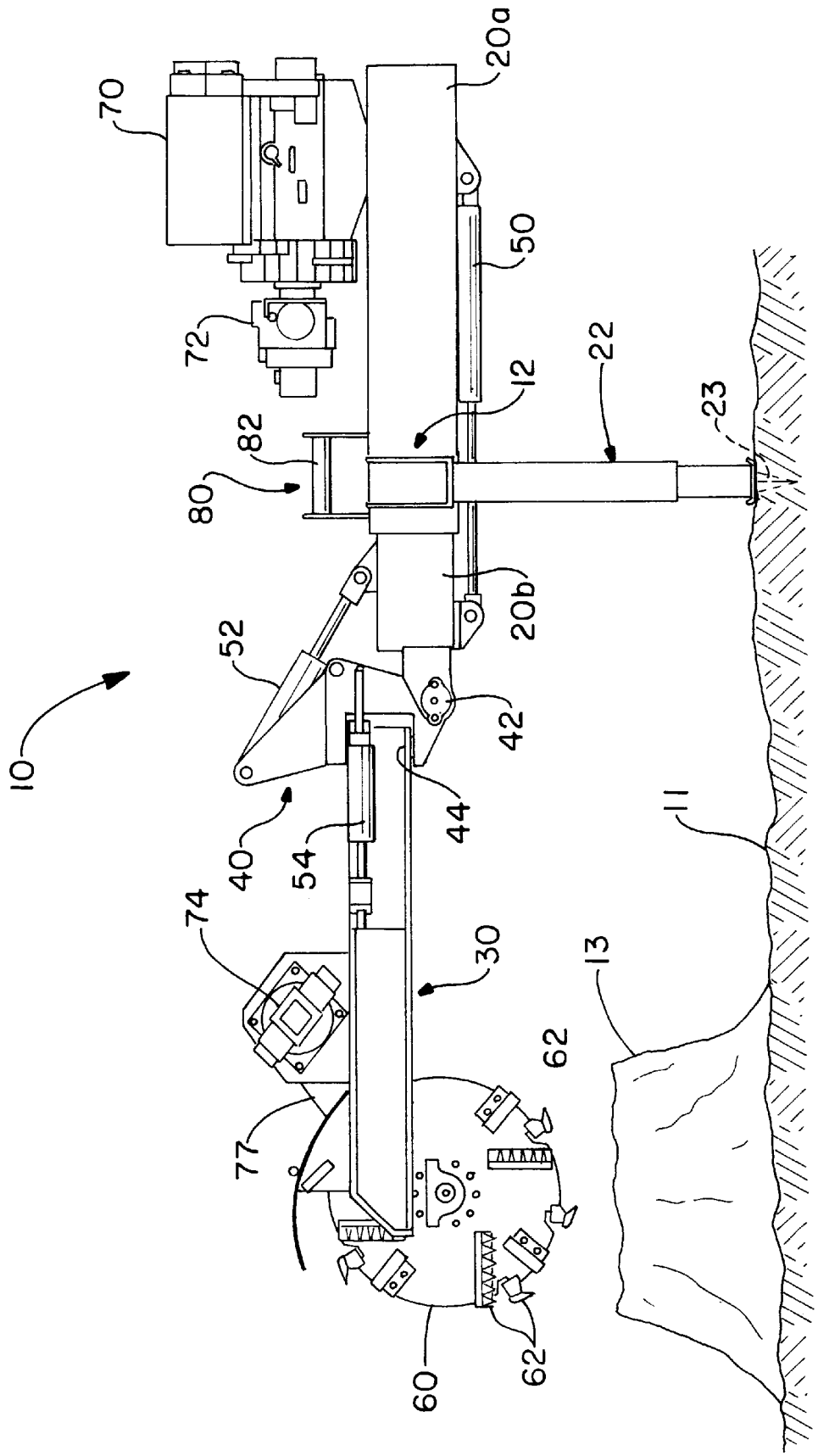
FIG. 5 is a left side elevational view of a stump cutter apparatus in accordance with the present invention.
Figure 6:
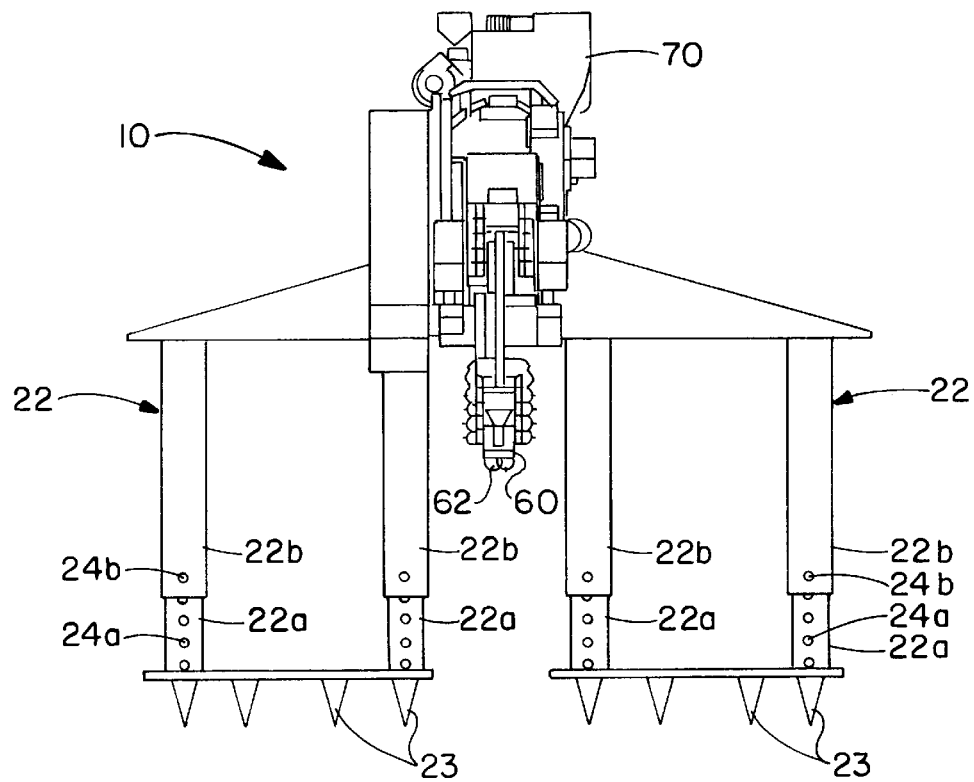
FIG. 6 is a front view in elevation of a stump cutter apparatus in accordance with the present invention.
Figure 7:
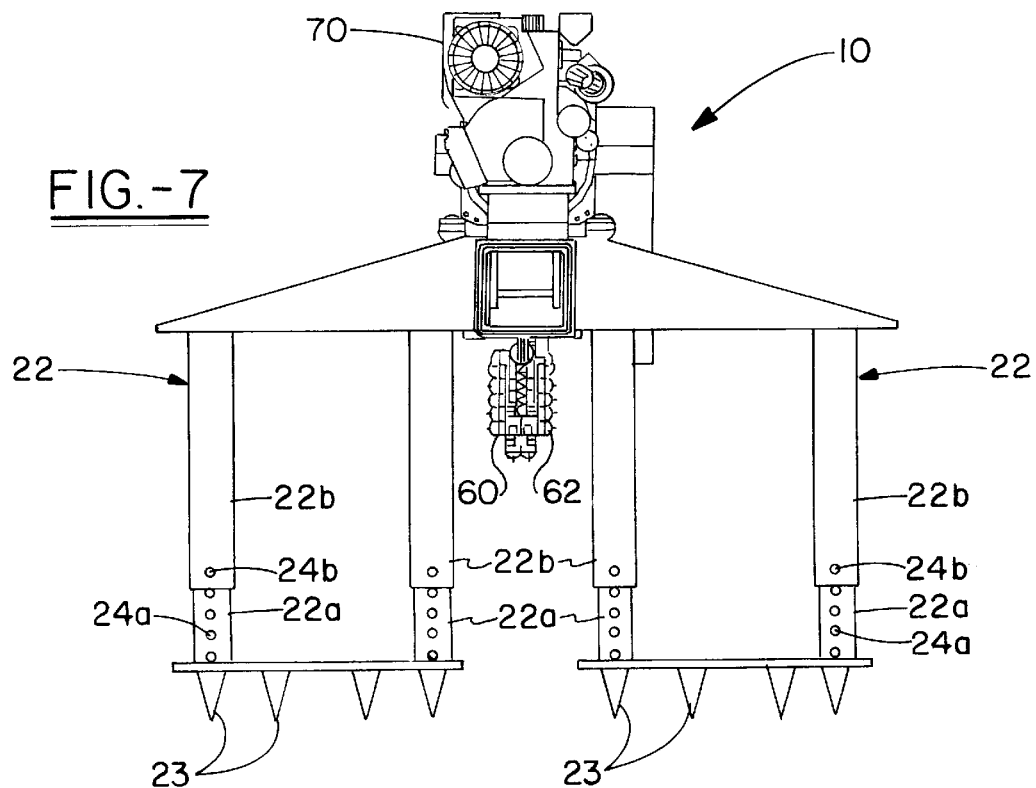
FIG. 7 is a rear elevational view of a stump cutter apparatus in accordance with the present invention.
Figure 8:
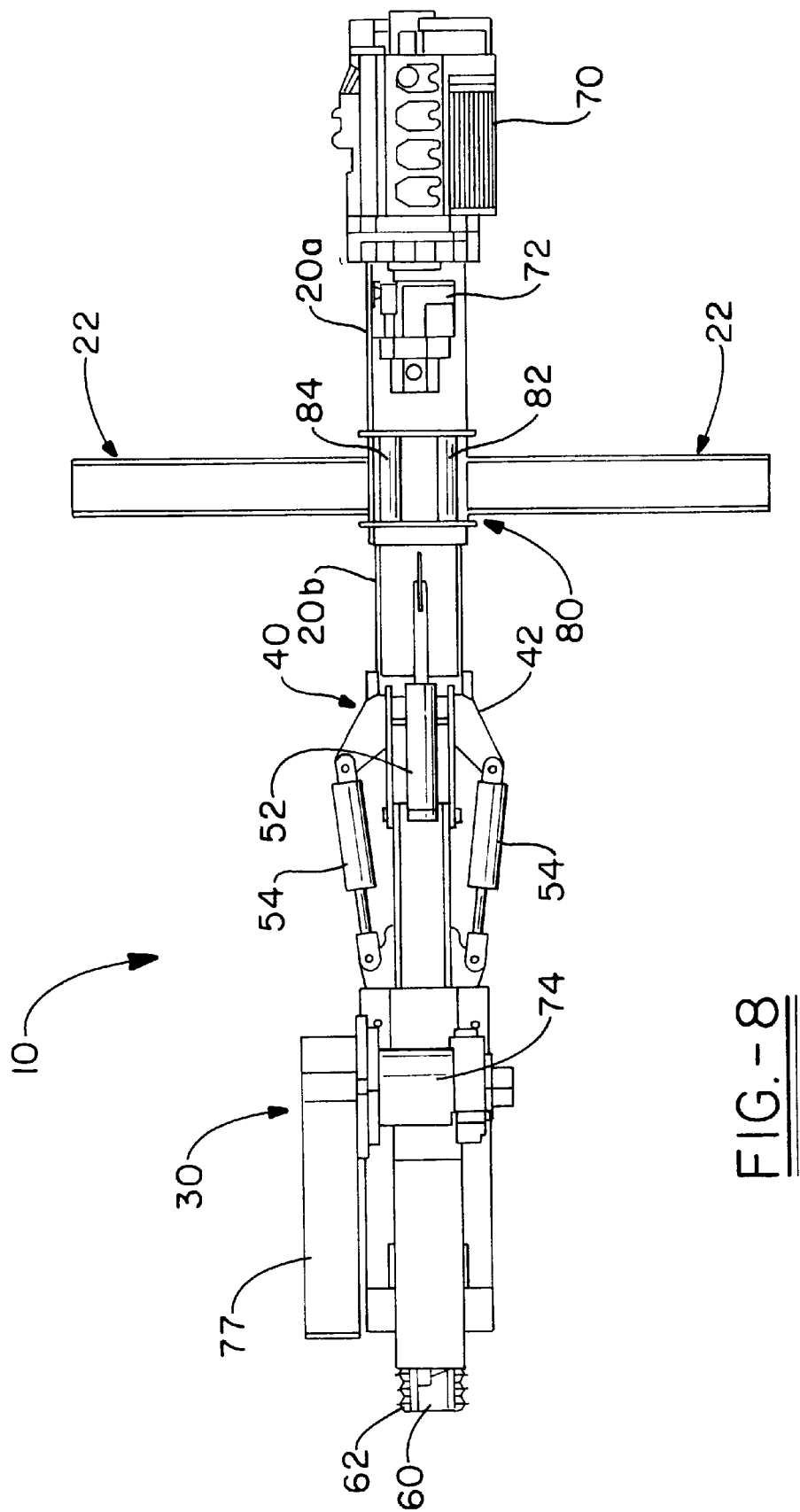
FIG. 8 is a top plan view of a stump cutter apparatus in accordance with the present invention.
Figure 9:
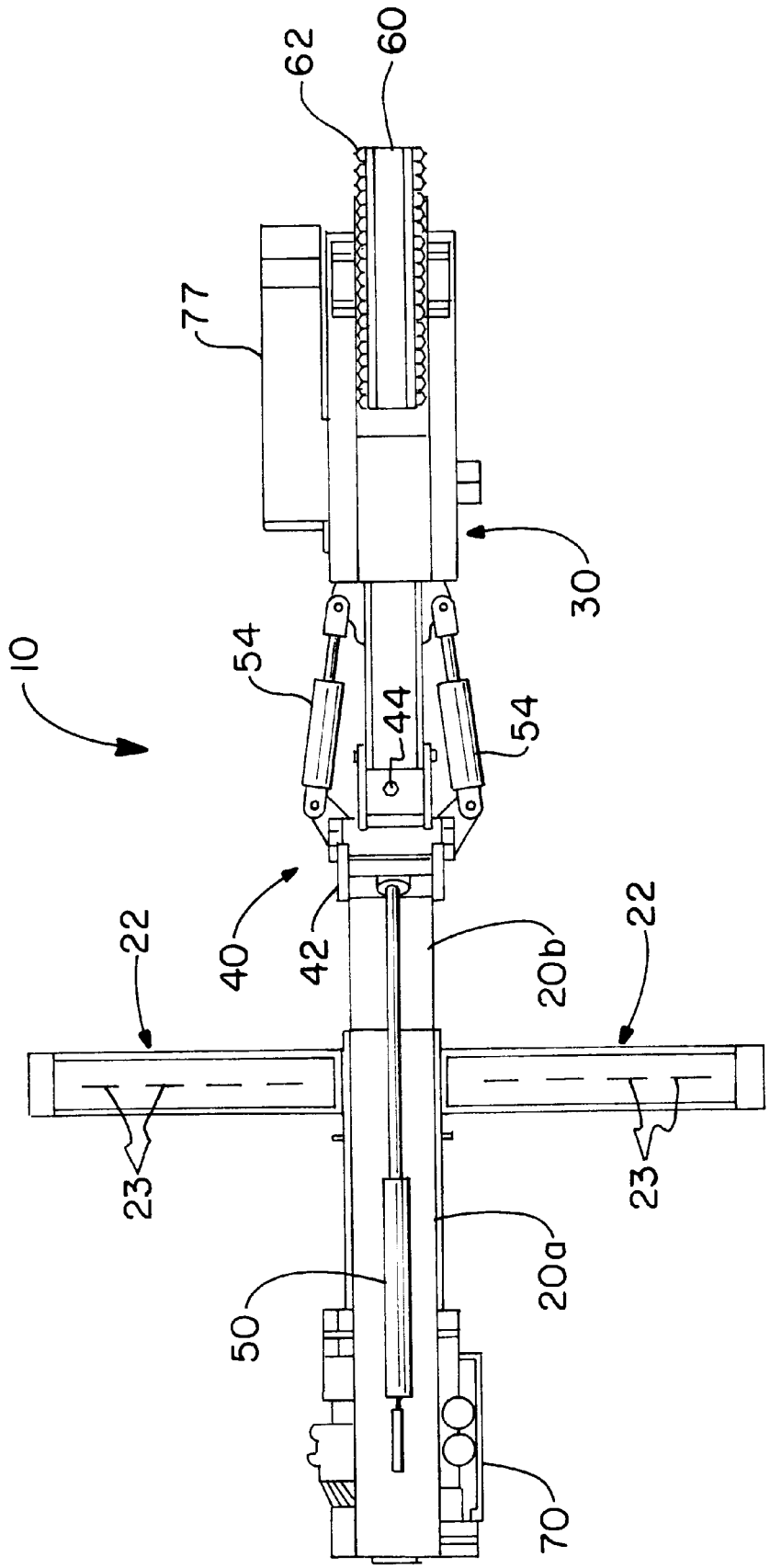
FIG. 9 is a bottom plan view of a stump cutter apparatus in accordance with the present invention.

Stump cutter apparatus 10, 10' (and 10" of FIG. 11 discussed below) includes an attachment member 80 for releasably connecting stump cutter 10, 10' to a prime mover such as an excavator E of the type used to excavate earth as illustrated herein. Those skilled in the art will recognize that the stump cutter 10, 10' may be attached to other prime movers such as front-end loaders, crawlers (track-driven front-end loaders), farm tractors, and the like with all of the advantages noted herein. The excavator E is shown herein as an example of a suitable prime mover. The attachment of stump cutter 10, 10' to an excavator E provides numerous advantages as discussed above. Specifically, stump cutter 10, 10' is releasably connected to the distal end of excavator boom B such that an operator of the excavator E located in the cab C of excavator E can position and operate the stump cutter 10, 10'. The attachment member 80 may be provided in a wide variety of forms, and the particular form may depend upon the manufacturer and model of excavator to which the stump cutter is to be attached. Suitable excavator attachment components are available from JRB Company, Inc. Akron, Ohio and other companies. In this manner, stump cutter apparatus 10, 10' may be fitted with any suitable attachment member 80 as required or requested by one purchasing, leasing, or renting the apparatus 10, 10' to be compatible with any excavator or other prime mover. As shown herein, attachment member 80 comprises first and second attachment pins 82, 84 to be engaged by a coupling member on the distal end of boom B such that stump cutter 10 is essentially transverse relative to the boom B as shown in FIGS. 2 and 3, and such that cutting wheel 60 is offset from boom B toward cab C of excavator E. This position of stump cutter 10, 10' relative to boom B is far superior to known excavator attached stump cutter attachments because the present invention provides the operator of the excavator (who is also the operator of the stump cutter 10, 10') with a clear and unobstructed view of the cutter head assembly 30, including the cutting wheel 60 and also the stump 13 being cut as is indicated in FIG. 2 by line L indicating the operator's line of sight. The relative position of stump cutter 10, 10' and boom B is shown most clearly in FIG. 3, wherein it can be seen that stump cutter 10, 10' is essentially transverse relative to boom B. An angle α is formed between cutter wheel 60 and boom B which is preferably in the range of 45° to 135°, and most preferably approximately 90° which has been found to be the safest location, in terms of visibility and lack of flying debris, from which to operate a stump cutter.

Figure 11:
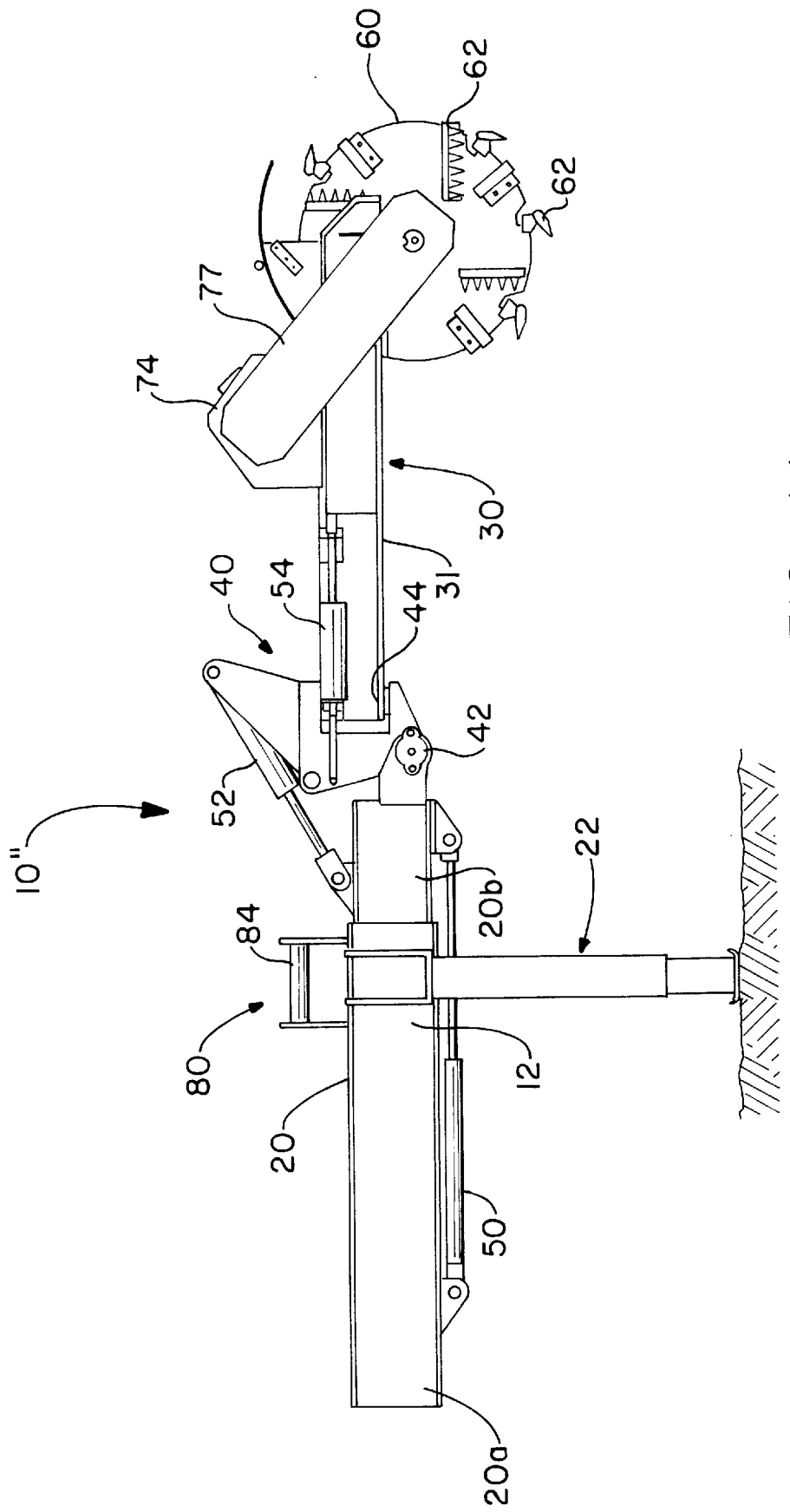

Stump cutter 10, 10' includes a control system 75 which is connected to engine 70, pump 72, cylinders 50, 52, 54, and other components as required to control the overall operation of the apparatus 10, 10'. Stump cutter control system 75 is connected to operator controls 78 in cab C of excavator E through a wired connection, established through an electrical coupling upon the attachment of stump cutter 10, 10' to boom B, a hydraulic connection established through a hydraulic coupling upon the attachment of stump cutter 10, 10' to boom B, or through a wireless control system using radio frequency, laser, or infrared control signals. In this manner, an operator has complete control over all stump cutter operations using control 78 within cab C of excavator E. Although stump cutter 10, 10' may include a self-contained fuel tank to supply fuel for engine 70, a fuel line may alternatively be provided between the fuel supply system of excavator E and the engine 70 of stump cutter 10, 10', with a quick-connect fuel line coupling provided between end of boom B and stump cutter 10, 10'. FIG. 11 shows a stump cutter apparatus 10" in accordance with the present invention that is similar in all respects to the stump cutter 10, 10', except that stump cutter 10" does not include its own engine. Instead, stump cutter 10" is configured to receive power from the main engine or an auxiliary engine of the prime mover such as excavator E to which it is attached. Thus hydraulic motor 74 and cylinders 50, 52, 54 receive hydraulic power through one or more suitable conduits from excavator E. Thus, a quick-connect system (a power take-off shaft, three point hitch, hydraulic fluid coupling, or the like) is provided to connect the hydraulic system of stump cutter 10" to the power system of the prime mover such as excavator E upon the attachment of stump cutter 10" to the prime mover as described.

Thus, a stump cutting apparatus 10, 10', 10" as described herein may be simply and quickly attached to the frame of a prime mover or to the boom B of an excavator using attachment member 80 and with any electrical, hydraulic, or fuel line coupling associated therewith. The location of the stump cutting apparatus 10, 10', 10" which is essentially transverse relative to the prime mover frame or boom B of the excavator E such that the cutting wheel 60 is offset toward the cab C of the excavator E provides the operator with a safe line of sight L between the cab C and the cutting wheel 60, as well as the stump 13 being eradicated. The transverse location of the cutting apparatus 10, 10' prevents or minimizes flying debris moving toward the operator in the cab C which improves safety and visibility.

The stump cutting apparatus 10, 10', 10" of the present invention also minimizes wear and tear on the excavator E or other prime mover in that once the cutting apparatus 10, 10', 10" is operatively positioned adjacent to a stump 13 to be removed, all the cutting work is performed solely by the stump cutter apparatus 10, 10', 10". Once the stump cutting apparatus 10, 10', 10" is supported above the ground 11 on the one or more leg assemblies 22 or wheel assembly 122, the prime mover E is utilized merely to restrain and/or balance the stump cutter 10, 10', 10" against excessive movement if required. The weight of the stump cutter 10,10', 10" is supported on the leg assemblies 22, wheel assembly 122, or a combination thereof, and all movement of the cutter head assembly 30 (as is required to remove the stump 13) is accomplished using the hydraulic cylinders 50, 52, and 54 as controlled by the operator in cab C using controls 78. In the preferred embodiment, as shown in FIGS. 1–9, it can be seen that the spikes 23 help to prevent unwanted movement of the stump cutter 10 during cutting operations which also helps to minimize wear on the excavator E or other prime mover.

Those skilled in the art will recognize that the foregoing description has set forth the preferred embodiment of the invention in particular detail and it must be understood that numerous modifications, substitutions and changes can be undertaken without departing from the true spirit and scope of the present invention.

What is claimed is:

1. A stump cutter apparatus for connection to an excavator boom comprising:

a stump cutter chassis having a longitudinal axis, a first end and a second end;

a cutter head assembly supported on said first end of said chassis;

an attachment member located along said chassis for releasably connecting said stump cutter chassis to said excavator boom; and wherein said cutter head assembly can move independent of said excavator boom.

2. The stump cutter apparatus of claim 1 wherein said stump cutter chassis comprises a telescoping frame wherein said cutter head assembly is retractably extendable relative to said second end of said chassis.

3. The stump cutter apparatus of claim 1 wherein said cutter head assembly comprises a cutter boom wherein said cutter boom is movable in a vertical plane relative to said chassis.

4. The stump cutter apparatus of claim 3 wherein said cutter boom is movable in a horizontal plane relative to said chassis.

5. The stump cutter apparatus of claim 1 wherein said cutter head assembly is powered by an engine located along said chassis.

6. The stump cutter apparatus of claim 5 wherein said engine is positioned on said second end of said chassis.

7. The stump cutter apparatus of claim 5 wherein said engine is positioned to act as a counterweight to said cutter head assembly.

8. The stump cutter apparatus of claim 1 wherein an angle between said excavator boom and said cutter boom is preferably in the range of about 45 degrees to about 135 degrees.

9. The stump cutter apparatus of claim 1 wherein said stump cutter chassis further comprises at least one support leg assembly used to support said chassis above a surface.

10. The stump cutter apparatus of claim 9 wherein said at least one support leg assembly comprises at least one spike extending downwardly.

11. The stump cutter apparatus of claim 9 wherein the height of said at least one support leg is adjustable.

12. The stump cutter apparatus of claim 1 wherein said stump cutter apparatus is self-contained.

13. The stump cutter apparatus of claim 1 further comprising a remote control system wherein operation of said stump cutter apparatus is performed from an operator's cab of said excavator.

14. The stump cutter apparatus of claim 1 wherein said connection is a male-female attachment.

15. The stump cutter apparatus of claim 1 wherein said attachment member is one or more pins which can be secured by a coupling member on said excavator boom.

16. The stump cutter apparatus of claim 1 wherein said longitudinal axis of said stump cutter chassis is mounted transverse to said excavator boom.

17. The stump cutter apparatus of claim 1 wherein said cutter head assembly is positioned on a driver side of said excavator.

18. A stump cutter apparatus for connection to a prime mover comprising:
   a wheel assembly;
   a stump cutter chassis having a longitudinal axis, a first end and second end;
   a cutter head assembly supported on said first end of said chassis;
   an attachment member located along said chassis for releasably connecting said stump cutter to said prime mover; and
   wherein said cutter head assembly can move independent of said prime mover.

19. The stump cutter apparatus of claim 18 wherein said longitudinal axis of said stump cutter chassis is mounted transverse to said prime mover.

20. The stump cutter apparatus of claim 18 further comprising a hydraulic means for powering said cutter head assembly, which is attached along said chassis.

21. A stump cutter apparatus for connection to a prime mover comprising:
   a stump cutter chassis having a longitudinal axis, a first end and second end;
   a cutter head assembly supported on said first end of said chassis;
   an attachment member located along said chassis for releasably connecting said stump cutter to said prime mover; and
   wherein said cutter head assembly can move independent of said prime mover.

22. The stump cutter apparatus of claim 21 wherein said at least one support leg assembly comprises at least one wheel assembly attached thereto and positioned to support said chassis.

23. The stump cutter apparatus of claim 22 wherein said at least one wheel assembly is restrained from rotation during operation of the stump cutter apparatus.

24. The stump cutter apparatus of claim 21 wherein said connection is a three point hitch.

25. The stump cutter apparatus of claim 21 wherein said longitudinal axis of said stump cutter chassis is mounted transverse to said prime mover.

26. The stump cutter apparatus of claim 21 further comprising a hydraulic motor and a plurality of hydraulic cylinders located along said chassis able to receive hydraulic power through at least one suitable conduit from said prime mover.

* * * * *